Nov. 23, 1971       R. E. MOSEMAN       3,621,581

HOLE DIAMETER MEASURING GAUGE

Filed Aug. 9, 1968

INVENTOR
RODNEY E. MOSEMAN

BY *Le Blanc & Shur*

ATTORNEYS

3,621,581
HOLE DIAMETER MEASURING GAUGE
Rodney E. Moseman, Lititz, Pa., assignor to
Hamilton Watch Company, Lancaster, Pa.
Filed Aug. 9, 1968, Ser. No. 751,460
Int. Cl. G01b 5/12
U.S. Cl. 33—178                                           11 Claims

ABSTRACT OF THE DISCLOSURE

The measuring gauge has an elongated cylindrical casing housing a plunger mounted for axial reciprocal movement and carrying a constantly tapered measuring needle externally of the casing. The plunger includes a pair of laterally spaced bars. A metal band having an S-shape is constrained between the bars with opposite ends of the band being fixed to the respective inner faces of the bars. A pair of different diameter rollers pivotally mounted to the casing and mounting respective dial hands on a gauge frictionally engage within the loop portions of the S-shaped band. Insertion of the needle into the hole with the corresponding end of the casing butting the annular margin of the hole provides a hole diameter measurement readout on the dial face.

---

The present invention relates to a gauge for measuring internal hole diameters and particularly relates to a gauge having a tapered measuring needle adapted to be inserted into a hole for measuring the internal diameter of the hole. Specifically, the present invention is concerned with a precision measuring instrument for accurately determining internal hole diameters with the measurement being on a dial readout.

Gauges for measuring internal diameters of holes have been provided in the past. One such gauge is described and illustrated in U.S. Patent No. 2,786,277 of common assignee herewith. In that patent, a spindle is spring biased for axial reciprocal movement within a casing and carries at one end a measuring needle having a constant taper. The needle is adapted for insertion into a hole, the diameter of which is to be measured. The opposite end of the spindle carries a graduated measuring scale which translates the axial displacement of the plunger and needle between a reference position and a position wherein the tapered needle engages the sides of the hole to provide a direct measurement of the hole diameter.

Specifically, when the needle is inserted into the hole such that the needle surface engages the internal periphery of the hole and the corresponding end of the casing butts the margin about the hole, the extent of the axial displacement of the spindle from a reference position is a function of the hole diameter since the taper of the needle is constant and known. The hole diameter can thus be read out at the opposite end of the spindle on an appropriate scale. Actuation of this gauge for a measurement however, requires the release of a trigger, the cooperating action of a pair of helical springs, ball bearings, a sleeve, a tapered recess, as well as other parts. This necessarily increases the cost of manufacture and assembly of this gauge. Moreover, the accuracy of this type of gauge is limited. While this prior gauge has proven satisfactory for most measurements, it has been found desirable to obtain even finer and more precise measurements of internal hole diameters for example, on the order of .0005 inch, than has heretofore been possible with such prior gauge. It has also been found desirable to provide such precision and fine measurement on a dial readout as well as to reduce the number of parts of the gauge and hence its cost.

To this end, the present invention provides an improved gauge for measuring internal hole diameters which is characterized by a cylindrical casing having a plunger mounted for axial reciprocal movement within the casing and carrying a constantly tapered measuring needle externally of the casing. The plunger includes a pair of axially elongated bars, and a narrow metal band having an S-configuration is constrained between the bars with opposite ends of the band being secured to the respective inside faces adjacent opposite ends of the plunger. A pair of different diameter rollers are pivotally mounted in the casing and frictionally engage within the loop portions of the S-shaped band. One end of the plunger is supported within the casing by a piston while the other plunger end is supported by the rollers. The band is tensioned about the rollers such that axial displacement of the plunger causes the band to rotate the rollers. The rollers carry the hands of a dial and the accuracy and fineness of the measurement afforded by this gauge is such that the dial face may be graduated in increments of, for example, .0005 inch.

The band has a substantially coextensive tapered slot which imparts an axial bias to the plunger in a direction to maintain the measuring needle in a fully extended position externally of the casing. To measure the diameter of a hole the needle is inserted into the hole and the corresponding end of the casing is butted against the marginal portions about the hole whereby the casing and plunger are axially displaced relative to one another. Since the taper of the needle is constant and known, this axial displacement is translated into its known diameter value which is displayed on the dial readout through the band and roller assembly. For example, with the dial calibrated to read the diameter of the tip of the measuring needle when it lies flush with the casing end, it will be seen that the displacement of the needle and plunger rotates the dial hands through the S-shaped band and roller assembly such that the larger diameter of the hole is accurately displayed on the dial readout. As an added feature, the plunger can be locked in the hole measuring position by a spring biased cam whereby the measuring needle can be withdrawn from the hole and the measurement on the dial then read.

Accordingly, it is a primary object of the present invention to provide an improved gauge for measuring internal hole diameters.

It is another object of the present invention to provide an improved measuring gauge affording fine and precision measurements of internal hole diameters.

It is still another object of the present invention to provide an improved gauge for measuring internal diameters having a dial readout.

It is a further object of the present invention to provide an improved gauge for measuring internal hole diameters which has fewer parts than previous gauges of this type, which is substantially frictionless in operation providing no slippage between the dial readout and the movement of the measuring needle, and which is readily easily and inexpensively constructed.

It is a still further object of the present invention to provide an improved gauge for measuring internal hole diameters of the type having a measuring needle carried by a plunger which is supported at one end by a mechanism providing an inherent bias to the plunger in a predetermined axial direction.

It is a still further object of the present invention to provide an improved hole diameter measuring gauge having the foregoing characteristics and wherein the plunger is automatically locked in its measuring position upon removal of the measuring needle from the hole.

These and further objects and advantages of the present invention will become more apparent upon reference to the following specification, claims and appended drawings wherein:

Figure 1:
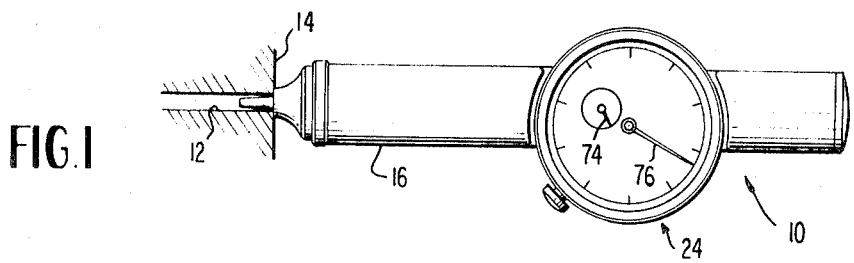
FIG. 1 is a plan view of a measuring gauge constructed in accordance with the principles of the present invention and illustrated in a measuring position relative to a member having a hole.

Referring to the drawings, particularly to FIG. 1, there is illustrated a gauge, generally indicated at 10, for measuring the internal diameter of a hole 12 in a member 14. Gauge 10 includes a casing 16 having axially spaced cylindrical end portions 18 and 20 with a cylindrical body portion 22 disposed between end portions 18 and 20 at right angles thereto and carrying a dial readout generally indicated at 24. End portions 18 and 20 define cylindrical chambers 26 and 27, respectively, and a pair of rectangular passages 28 and 30 are formed through respective opposite ends of body portion 22. An externally threaded end cap 32 is threadedly received within the open internally threaded end of cylindrical portion 18, cap 32 having a central bore hole 33. Cap 32 includes a reduced annular area 34 formed at its outer end and has an internal recess 35 formed through its inner face, all for purposes as will presently become clear. A lock nut 36 is threaded about end cap 32 whereby the end cap may be secured in selected axially adjusted position relative to casing 10, for gauge calibration purposes as will become clear. A plug 37 closes the end of cylindrical portion 20.

A plunger 38 is carried within casing 10 for axial reciprocal movement in chambers 26 and 27 and passages 28 and 30, and comprises a piston 40 mounted for sliding movement within cylindrical chamber 26. A rectangular mounting block 42 (FIG. 3) is disposed against the inner face of piston 40 and a measuring needle 44 is suitably secured against the opposite face of piston 40 by a threaded projection 46 which is received in a complementary threaded bore and threaded recess in piston 40 and mounting block 42, respectively. Piston 40 and mounting block 42 may be an integral one-piece construction. Measuring needle 44 extends through bore 33 of end cap 32 and the diametrically enlarged portion 48 of needle 44 butts an annular cushion 50 seated in recess 35. The exposed portion of needle 44 beyond annular face 34 and with the plunger 38 in the illustrated fully extended position (FIG. 2), is provided with a constant taper throughout its length.

A pair of elongated bars 52 and 54 are mounted on opposite sides of rectangular mounting block 42 in transversely spaced relation, one to the other, as by head screws 54. A similar rectangular mounting block 56 is secured between the opposite ends of the bars by screws 57. A thin, preferably metal, strip or band 58 having an S-shaped configuration is constrained between bars 52 and 54. (The S-configuration is shown in a reversed position in FIG. 3 and it would be apparent that a generally S-shape would result when looking within the gauge from its opposite face.) One end of band 58 is clamped between mounting block 42 and the end of bar 52 directly behind piston 40 and adjacent one end of the plunger while the other end of band 58 is clamped between the end of bar 54 and end piece 56 adjacent the opposite end of plunger 38. A pair of rollers 60 and 62, having predetermined different diameters, are pivotally mounted at one end to a support plate 64 suitably secured to body portion 22 of casing 10 and their opposite ends have extended shafts 61 and 63, respectively, mounted in bearings, not shown, carried by plate 66 which preferably forms an integral part of casing 16. Shafts 61 and 63 extend through plate 66 for reasons as will become clear. Rollers 60 and 62 are received within the loop portions of S-shape band 58 and the band is tensioned such that the band frictionally engages the rollers. With this arrangement, it will be seen that the rollers 60 and 62 inherently support the inner end portion of the plunger and that axial displacement of the plunger within casing 10 in either direction drives rollers 60 and 62 in opposite directions.

Dial 24 includes an annular bezel 68 suitably secured about the dial base plate 66, clamping a dial face 70 to base plate 66. A crystal 72 is secured to bezel 68 in the usual fashion. The extended roller shafts 61 and 63 extend through the bearings in base plate 66 and carry indicator hands 74 and 76. Thus, with predetermined roller diameters, dial face plate 70 can be graduated to provide fine and coarse measurements for dial hands 76 and 74, respectively.

Figure 2:
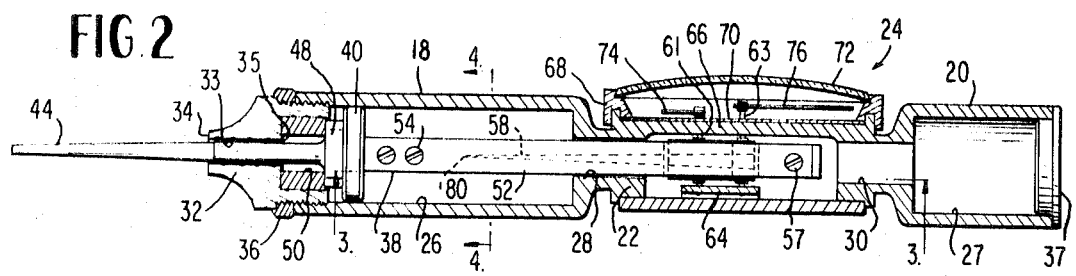
FIG. 2 is an enlarged longitudinal cross sectional view thereof illustrating the plunger member in fully extended position.
Figure 5:
FIG. 5 is a plan view of a band employed herewith and illustrated on a reduced scale in a flat extended position.
Figure 4:
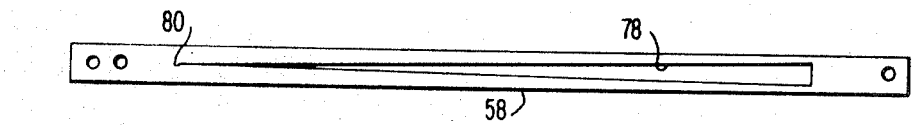
FIG. 4 is an enlarged cross sectional view thereof taken about on line 4—4 of FIG. 2.
Figure 4:
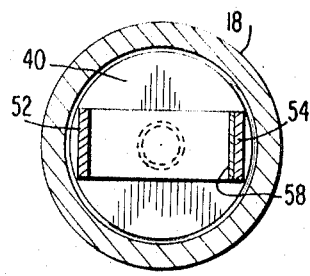

The plunger member is axially biased to maintain measuring needle 44 in its outermost extended position (FIG. 2). To provide such bias, a tapered slot 78 (FIG. 5) is formed in band 58 substantially co-extensive with its length. The apex 80 of the slot lies adjacent mounting block 42 and the slot becomes progressively wider as the band winds about rollers 62 and 60. An axial force in a direction to bias plunger 38 outwardly is derived from the change in the effective width of the band over the length of the band.

Prior to use, the gauge is preferably calibrated such that a diameter reading on dial 24 equal to the known diameter of the tip of needle 44 is provided when the tip lies flush with annular surface 34. Alternatively, the gauge may be calibrated such that the dial reads the diameter of any known position along the constantly tapered needle, as provided by a scribe line or lines (not shown), when such line or lines are aligned with the surface 34. As a further example, the dial can be calibrated to indicate the diameter of the base of the needle aligned with surface 34 when the needle is fully extended, as illustrated in FIG. 2. With the measuring needle 44 biased into the fully extended position, it can be inserted into, for example, the hole 12, the diameter of which is to be measured. The tapered portion of needle 44 will thus engage the lip of the hole and the gauge is then displaced toward the hole such that the annular surface 34 butts the marginal portions about the hole. In this manner, the plunger is displaced relative to the casing and rollers 60 and 62 are rotated a predetermined amount whereby the dial hands 74 and 76 are likewise rotated about the dial face 70. The diameter of the hole is thus displayed on the dial.

Figure 3:
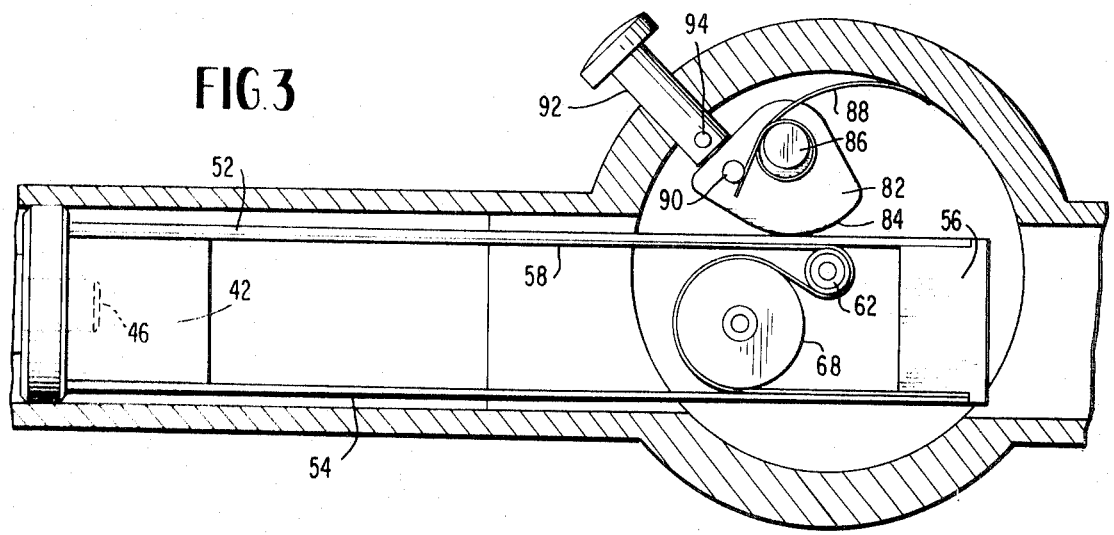
FIG. 3 is an enlarged cross sectional view thereof taken about on line 3—3 of FIG. 2.

In order to lock the plunger in a predetermined measuring position upon removal of the gauge needle from the hole, a cam 82 having a cam surface 84 is mounted for pivotal movement about a pin 86. The cam 82 is normally biased into engagement with bar 52 by a helical spring 88 wound about pin 86. One end of spring 88 bears against the inner face of body 22 with the opposite end of the spring bearing against a pin 90 carried by cam 82 whereby cam 82 is biased in a clockwise direction as seen in FIG. 3 to normally frictionally engage bar 52. When the needle 44 is inserted into the hole and the gauge is moved such that area 34 lies flush about the hole 12, cam 82 permits plunger 38 to slide relative to casing 16. When the needle is withdrawn from the hole, cam 82 automatically engages bar 52 and frictionally locks it in the measured position whereby the diameter of the hole may be read on dial 24 with the gauge removed from the hole.

An axially movable button 92 is carried by body 22 and carries a pin 94 on its inner end to retain button 92 in casing 10. By depressing button 92, cam 82 is rotated against the bias of spring 88 out of engagement with bar 52 whereby the plunger is released for return to its normally fully extended position, illustrated in FIG. 2, under the natural bias of band 58.

Alternatively, cam 82 can be disposed as to normally bear against pin 92 out of engagement with bar 52 whereby the plunger 38 would position under the axial bias of spring 58. In this form, the button 92 is depressed to retain plunger 38 in the measuring position before the needle is removed from the hole, that is, prior to disengaging the area 34 from about the hole margin. By keeping the button 92 depressed and hence the cam 82 in firctional locking engagement against bar 52, the dial 24 can be read to provide the diameter of the hole when the gauge is removed from the hole. Upon release of the button, the plunger 38 would, in this form, return to its fully extended position.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are intended therefore to be embraced therein.

What is claimed and desired to be secured by United States Letters Patent is:

1. A gauge for measuring the diameters of holes comprising an elongated housing, a plunger mounted within said housing for axial reciprocable movement relative thereto, said plunger having an end portion movable through a corresponding end portion of said housing and adapted to be received within the hole to be measured, a pair of rollers, at least one of said rollers being pivotally carried by said housing, said plunger including a pair of spaced parallel guide surfaces on opposite sides of said rollers, a thin flexible band engageable along said guide surfaces and having a generally S-shape portion intermediate its ends engaging about said rollers and disposed between said guide surfaces, opposite end portions of said band being carried by the plunger, said rollers engaging in the respective loops formed by said S-shaped band portion, said band being tensioned about said rollers to constrain said rollers for counterrotation between said guide surfaces substantially without slippage between said rollers and said band in response to axial movement of said plunger, means for biasing said plunger in one axial direction, and indicating means coupled to at least one of said rollers.

2. A gauge according to claim 1 wherein said biasing means includes a slot formed in said band.

3. A gauge according to claim 1 wherein said housing end portion has a surface adapted to butt the marginal portions about a hole, said plunger being biased into a normal predetermined position with said plunger end portion fully extended from said casing, said plunger end portion having a constant taper throughout substantially its full length, the relative axial displacement of said plunger and casing when said tapered end portion engages within the hole and said surface butts the marginal portions about the hole providing a measurement of the diameter of the hole.

4. A gauge according to claim 1 including means for releasably locking said plunger in selected axial positions throughout the full range of axial movement of said plunger.

5. A gauge according to claim 4 wherein said locking means includes a pivotally mounted cam movable into a first position engaging said plunger to lock the latter in selected axial positions relative to said casing and means for moving said cam into a second position out of engagement with said plunger.

6. A gauge according to claim 5 including a spring normally biasing said cam into said first position, and a member operable externally of said casing and engageable with said cam to pivot said cam against the bias of said spring into said second position.

7. A gauge according to claim 1 wherein said housing includes a chamber, said plunger including a piston axially movable in said chamber and supporting an end portion of said plunger, said rollers supporting the opposite end portion of said plunger.

8. A gauge according to claim 1 wherein said biasing means is provided solely by said band.

9. A gauge according to claim 1 wherein said plunger guide surfaces comprise a pair of transversely spaced bars, one end of said band being secured to the inside face of one of said bars adjacent one end of the plunger, the other end of said band being secured to the inside face of the other bar adjacent the opposite end of the plunger, said band being disposed such that unsecured band portions between the opposite ends of the band and said rollers bear against the respective inner faces of said bars whereby axial movement of said plunger relative to said rollers peels a band portion from one bar and applies the other band portion to the other bar.

10. A gauge according to claim 9 wherein said biasing means is provided solely by said band.

11. A gauge for measuring the diameter of a hole comprising a casing, a plunger carried by said casing for axial reciprocal movement relative thereto, said plunger having a tapered end portion adapted to be received within the hole to be measured, a dial readout on said casing including diameter indicating indicia, means biasing said plunger to a predetermined axial position, and means connected to said dial readout and responsive to axial movement of said plunger from said predetermined position when said tapered end portion is inserted into a hole to indicate the diameter of the hole on said dial readout, said connecting means including a pair of rollers, at least one of said rollers being pivotally carried by said casing, said plunger having a pair of spaced parallel guide surfaces on opposite sides of said rollers, a thin flexible band engageable along said guide surfaces and having a generally S-shaped portion intermediate its ends engaging about said rollers and disposed between said guide surfaces, opposite end portions of said band being carried by the plunger, said rollers engaging within the respective loops formed by said S-shaped band portion, said band being tensioned about said rollers to thereby constrain said rollers for counterrotation between said guide surfaces substantially without slippage between said rollers and said band in response to axial movement of said plunger.

References Cited

UNITED STATES PATENTS

| | | | |
|---|---|---|---|
| 1,263,404 | 4/1918 | Green | 74—89.2 |
| 2,585,368 | 2/1952 | Carroll | 74—89.2 |
| 2,786,277 | 3/1957 | Zifferer | 33—178 A |
| 3,194,343 | 7/1965 | Sindlinger | 185—37 |

FOREIGN PATENTS

| | | | |
|---|---|---|---|
| 840,330 | 7/1960 | Great Britain | 33—172 A |

LEONARD FORMAN, Primary Examiner

D. A. DEARING, Assistant Examiner

U.S. Cl. X.R.

116—129; 185—37